United States Patent
Caporale et al.

(10) Patent No.: US 12,258,222 B2
(45) Date of Patent: Mar. 25, 2025

(54) FEED APPARATUS AND METHOD FOR AUTOMATICALLY FEEDING CASINGS FOR SMOKING ARTICLES

(71) Applicant: I.M.A. INDUSTRIA MACCHINE AUTOMATICHE S.P.A., Ozzano Dell'Emilia (IT)

(72) Inventors: Antonio Caporale, Ozzano Dell'Emilia (IT); Adriano Di Monte, Ozzano Dell'Emilia (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 0 days.

(21) Appl. No.: 18/561,920

(22) PCT Filed: May 20, 2022

(86) PCT No.: PCT/IT2022/050134
§ 371 (c)(1),
(2) Date: Nov. 17, 2023

(87) PCT Pub. No.: WO2022/244026
PCT Pub. Date: Nov. 24, 2022

(65) Prior Publication Data
US 2024/0239615 A1    Jul. 18, 2024

(30) Foreign Application Priority Data
May 20, 2021 (IT) .......... 102021000013223

(51) Int. Cl.
| B65G 47/86 | (2006.01) |
| A24C 5/00 | (2020.01) |
| A24C 5/02 | (2006.01) |
| B65G 43/08 | (2006.01) |
| B65G 59/06 | (2006.01) |
| B65G 59/10 | (2006.01) |

(52) U.S. Cl.
CPC ............ *B65G 47/847* (2013.01); *A24C 5/002* (2013.01); *A24C 5/02* (2013.01); *B65G 43/08* (2013.01);
(Continued)

(58) Field of Classification Search
CPC .. B65G 59/061; B65G 59/062; B65G 59/066; B65G 59/101; B65G 59/103;
(Continued)

(56) References Cited

U.S. PATENT DOCUMENTS 3,735,896 A * 5/1973 Mistarz ................. B65B 43/44
221/210
3,923,200 A  12/1975 Miller
(Continued)

FOREIGN PATENT DOCUMENTS

| CN | 105460626 | 4/2016 |
| CN | 109250515 A * | 1/2019 ........... B65G 59/101 |

(Continued)

OTHER PUBLICATIONS

International Search Report filed in PCT/IT2022/050134 mailed Sep. 22, 2022.

*Primary Examiner* — Gregory W Adams
(74) *Attorney, Agent, or Firm* — RANKIN, HILL & CLARK LLP (57) ABSTRACT

A feed apparatus for automatically feeding casings for smoking articles toward a transport member includes a feed unit disposed in a position above the transport member and configured to temporarily support the casings before they are fed to the transport member below, and a conveyor unit interposed between the feed unit and the transport member to selectively pick up the casings from the feed unit and send them to the transport member.

14 Claims, 5 Drawing Sheets

(52) U.S. Cl.
CPC ......... *B65G 59/062* (2013.01); *B65G 59/106* (2013.01); *B65G 2201/0226* (2013.01); *B65G 2203/0241* (2013.01)

(58) Field of Classification Search
CPC .. B65G 59/105; B65G 59/106; B65G 47/846; B65G 29/00; B65G 43/08; B65G 47/847; B65G 2203/0241; B65G 2201/0226; A23G 7/0025; B65B 43/44; B65B 19/04; B65B 35/08; B65B 35/26; B65B 35/12; A24C 5/02; A24C 5/06; A24C 5/002
See application file for complete search history.

(56) References Cited

U.S. PATENT DOCUMENTS

| | | | |
|---|---|---|---|
| 4,782,644 A | 11/1988 | Haarer | |
| 4,897,019 A * | 1/1990 | Lemaire | B65G 59/102 221/242 |
| 5,918,765 A * | 7/1999 | Blankenship | B65B 43/44 221/221 |
| 6,558,110 B2 * | 5/2003 | Lu | H01L 21/68707 221/297 |
| 7,549,557 B2 | 6/2009 | Lehmann | |
| 2020/0055185 A1 * | 2/2020 | Hirata | B65G 59/061 |

FOREIGN PATENT DOCUMENTS

| | | | | |
|---|---|---|---|---|
| CN | 110668197 A * | 1/2020 | | B65G 43/08 |
| DE | 2238389 | 2/1974 | | |
| DE | 4016094 | 11/1990 | | |
| DE | 10 2015 224256 | 3/2017 | | |
| FR | 2521536 A1 * | 8/1983 | | A01G 9/088 |
| JP | H06131547 A * | 5/1994 | | B65G 59/06 |
| WO | 2009/071272 | 6/2009 | | |

* cited by examiner fig. 1 fig. 2 fig. 8 fig. 9 fig. 10 fig. 11 fig. 12

FEED APPARATUS AND METHOD FOR AUTOMATICALLY FEEDING CASINGS FOR SMOKING ARTICLES

FIELD OF THE INVENTION

The present invention concerns a feed apparatus and method for automatically feeding empty casings for smoking articles, such as cigarettes or suchlike, for example from a feed member, in which the casings can be positioned, preferably stacked in one or more stacks, both manually and also by means of automated members, toward a transport member of a machine configured to fill the casings and complete the production of smoking articles.

BACKGROUND OF THE INVENTION

In the automated production of smoking articles, such as for example cigarettes, or suchlike, especially using machines with high productivity, it is known that one of the important aspects to be taken into consideration and of the technical problems to be overcome is the feeding of the containing material, usually very thin paper, or other suitable material, possibly in the form of a casing including a filter, to one or more work stations, for example a filling station, in which the smoking material is deposited or inserted in the containing material, for example, loose material, such as tobacco, other smokable substances, or a combination thereof. A packaging station, a distribution station and possibly also a station for packing the smoking articles can also be associated with the filling station.

With regard to the technical problem of feeding the containing material, it is known to prearrange a paper strip on which to lay the above said loose material. The paper strip is subsequently wound to form a single tubular casing containing the loose material, which is then cut according to the desired format to obtain the individual smoking articles.

However, this known technique does not allow to automatically package some types of smoking articles, for example those also containing leaf material other than tobacco, which has various peculiarities linked above all, but not only, to the chemical-physical characteristics of this material.

An example of a machine configured to fill and close hollow containers for smoking articles is described in U.S. patent document U.S. Pat. No. 4,782,644. In particular, these hollow containers are configured to contain material in the form of a particulate suitable to generate an aerosol and a combustible element which functions as a closing insert.

Therefore, in the current state of the art, there is a need for feed apparatuses and methods to automatically feed prepackaged casings for smoking articles to then be completed in other work stations of an automated machine which also aims for high productivity, meaning, for example, an hourly production of over 7,000 smoking articles.

Therefore, one purpose of the present invention is to provide a feed apparatus and to perfect a feed method for the automatic feed of casings for smoking articles, which is simple and reliable and which at the same time allows to reach a high level of productivity, as indicated above, by solving the technical problem as above.

Another purpose of the present invention is to provide a feed apparatus and to perfect a feed method for the automatic feed of casings for smoking articles, in which it is possible to exploit the force of gravity to convey each casing, possibly stacked together with others, to a transport member.

Another purpose of the present invention is to provide a feed apparatus and to perfect a feed method for the automatic feed of casings for smoking articles, in which the casings can be fed both serially and also in parallel, so as to feed several casings at the same time to the same transport member.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, and to solve the technical problem in a new and original way, obtaining surprisingly positive results, a feed apparatus according to the present invention is configured to automatically feed casings for forming smoking articles toward at least one transport member having one or more first seatings aligned along a substantially horizontal transport axis and configured to each receive one of the above said casings. The casings are hollow and stackable so as to be partly inserted one into the other to form stacks of casings.

In accordance with one aspect of the present invention, the apparatus comprises at least feed means disposed in a position above the aforementioned at least one transport member and configured to temporarily support the stacks of the said casings, in particular before they are conveyed downward into the above said one or more first seatings of the above said at least one transport member, and conveyor means interposed between the above said feed means and the above said at least one transport member and configured to selectively convey the above said casings from the above said feed means one by one toward the above said one or more first seatings of the above said at least one transport member.

In accordance with another aspect of the present invention, each of the above said stacks comprises at least a first casing located at a lower end of the respective stack and into which at least a second casing is partly inserted from above; furthermore, the above said conveyor means comprise first stop means configured to move from a position of interference in which they cooperate, for each of the stacks, with the above said first casing to temporarily stop the fall of the first casing, and a position of non-interference, in which they free the said first casing, so that it can be released into one of the said one or more first seatings of the transport member. The first stop means are disposed in a first determinate intermediate position between the above said feed means and the above said at least one transport member.

In accordance with another aspect of the present invention, the conveyor means also comprise second stop means disposed between the above said feed means and the above said first stop means and configured to move between an engagement position, in which they cooperate, for each of the said stacks, with the second casing closest to the first casing in order to temporarily stop, for each of the above said stacks, the casings above the said first casing, at least when the said first stop means are in the position of non-interference, and a disengagement position, in which they free the second casing closest to the first casing to let it fall onto the said first stop means, only while the said first stop means are in the position of interference. The second casing let fall by the said second stop means becomes the new first casing when it arrives at the said first stop means. This configuration advantageously allows the first casing to be unstacked from the second casing and from the remaining casings of the same stack, so as to be individually fed to a respective underlying seating of the transport member.

In accordance with another aspect of the present invention, the above said conveyor means also comprise first actuation means configured to selectively displace the above said first stop means between the said position of interference, in which they interfere with the descent of the above said stacks of casings, and the said position of non-interference, in which the first stop means are in a retracted position which is outside the travel of the above said first casing toward the above said at least one transport member, and second actuation means configured to selectively actuate the above said second stop means between the said engagement position, in which they selectively block the above said second casing closest to the first casing to prevent the casings above it from falling, and the said disengagement position, in which they let the second casing descend toward the above said first stop means.

In accordance with another aspect of the present invention, the above said conveyor means also comprise gripping means configured to grip, for each of the above said stacks, the above said first casing from the said first stop means to take the first gripped casing into proximity of the transport member so as to release it into a corresponding one of the above said one or more first seatings of the transport member.

In accordance with another aspect of the present invention, the first gripping means are mobile along a first rectilinear segment, lying on a vertical plane, between a first raised position, when they grip the said first casing, and a second lowered position, when they take the said first casing gripped into proximity to the said at least one transport member.

In accordance with another aspect of the present invention, the gripping means are configured to grip the said first casing in the first raised position when the first stop means are in the position of interference, and move to the second lowered position to take the said first gripped casing into proximity to the said at least one transport member, when the said first stop means are in the position of non-interference.

In accordance with another aspect of the present invention, the above said feed means comprise a rotating member rotatably mounted rotatable about a substantially vertical axis of rotation and having a plurality of second seatings parallel to the axis of rotation and configured to each receive one of the above said stacks of the above said casings; moreover, the above said rotating member is configured to perform incremental rotations, each of a determinate angle, to selectively take a row of the above said plurality of second seatings disposed along a radial segment of the rotating member into vertical alignment with the conveyor means, and therefore with the above said one or more first seatings of the above said at least one transport member.

In accordance with another aspect of the present invention, the above said second stop means and the above said gripping means each comprise at least one gripper having a pair of jaws, configured to open and close selectively on the above said casings.

In accordance with another aspect of the present invention, the apparatus also comprises detection means positioned between the lower part of the above said feed means and the upper part of the above said conveyor means, to detect the possible presence of at least one of the above said casings between the above said feed means and the above said conveyor means.

In accordance with another aspect of the present invention, the detection means are configured to detect, in each stack, the possible lack of casings with respect to a determined pre-established number. The apparatus also comprises an electronic control unit configured to control, in response to a signal emitted by the said detection means, the said second stop means so that they selectively retain the stack the number of casings of which is lower than the determined pre-established number, so as to inhibit the movement in the disengagement position of the said second stop means, at least until the electronic control unit receives a signal from the detection means corresponding to the detection of a number of casings at least equal to the determined pre-established number.

In accordance with another aspect of the present invention, the above said feed means comprise a closing disc configured to alternatively assume a closing position and an operating position, to respectively prevent or allow the stacks of casings to descend from the feed means toward the conveyor means. More specifically, the closing disc is configured to selectively occlude the said plurality of second seatings and free only the second seatings which are located along the row disposed along the said radial segment in vertical alignment with the said conveyor means, so as to allow the descent only of the stacks of casings located in the second seatings that are not occluded by the closing disc.

In accordance with another aspect of the present invention, the rotating member comprises an upper disc and a lower disc disposed coaxial and opposite to each other, with a plurality of tubular elements interposed, communicating with the said plurality of second seatings; the said tubular elements being disposed parallel to the axis of rotation.

In accordance with another aspect of the present invention, the first stop means comprise a comb-shaped plate which is mobile along a second rectilinear segment, lying on a horizontal plane, when it moves between the position of interference and the position of non-interference.

In accordance with another aspect of the present invention, the distance, taken along a vertical axis, between the first stop means and the second stop means remains fixed and is slightly greater than the length of the said casings.

In accordance with another aspect of the present invention, a feed method for automatically feeding casings for smoking articles toward at least one transport member having one or more first seatings aligned along a substantially horizontal transport axis and configured to each receive one of the above said casings, in which the said casings are hollow and stackable so as to be partly inserted one inside the other, forming stacks of casings.

The method comprises at least one feed step in which feed means disposed in a position above the above said at least one transport member feed the said stacks of casings to conveyor means interposed between the above said feed means and the above said at least one transport member, and a conveying step in which the said conveyor means selectively convey the above said casings, one by one, toward the above said one or more first seatings of the above said at least one transport member.

In accordance with another aspect of the present invention, the feed method provides that in the above said conveying step first stop means comprised in the conveyor means, disposed between the above said feed means and the above said at least one transport member, are moved between a position of interference, in which they cooperate, for each of the above said stacks, with the above said first casing, temporarily stopping the fall of the first casing, and a position of non-interference, in which they free the said first casing, so that the first casing freed is released into one of the said one or more first seatings of the transport member.

In accordance with another aspect of the present invention, the feed method provides that in the above said conveying step second stop means comprised in the said conveyor means, disposed between the above said feed means and the above said first stop means, are moved between an engagement position, in which they cooperate, for each of the said stacks, with the second casing closest to the first casing, temporarily stopping the fall, for each of the said stacks, of the casings above the said first casing, at least when the said first stop means are in the position of non-interference, and a disengagement position, in which they free the second casing closest to the first casing and let it fall onto the said first stop means, only while the said first stop means are in the position of interference. This second casing which is let fall by the said second stop means becomes the new first casing when it arrives at the said first stop means.

In accordance with another aspect of the present invention, the feed method provides that in the above said conveying step gripping means of the above said conveyor means, for each of the above said stacks, grip the above said first casing from the said first stop means and take it into proximity to the transport member to release it into a corresponding one of the above said one or more first seatings of the transport member. In particular, the gripping means take the first casing gripped from a first raised position, distant from the above said at least one transport member, to a second lowered position, close to the above said at least one transport member.

In accordance with another aspect of the present invention, when the said gripping means grip the said first casing, the said first stop means are in the position of interference, and when, on the other hand, the said gripping means take the said first gripped casing in proximity to the said at least one transport member, the said first stop means are in the position of non-interference.

In accordance with another aspect of the present invention, the feed method provides that in the above said feed step a rotating member of the above said feed means, mounted rotatable around a substantially vertical axis of rotation and provided with a plurality of second seatings, receives in one or more of the above said second seatings one or more of the above said casings organized so as to form the above said stacks and performs incremental rotations, each of a determinate angle, to selectively take a row of the above said plurality of second seatings disposed along a radial segment of the said rotating member into vertical alignment with the above said conveyor means.

In accordance with another aspect of the present invention, the feed method also comprises a control step, in which detection means positioned between the said feed means and the said conveyor means detect the possible lack of one or more of the above said casings in each stack, with respect to a determined pre-established number of casings, and in which an electronic control unit, in response to a signal emitted by the above said detection means, controls the above said second stop means so that they selectively retain the stack the number of casings of which is lower than the determined pre-established number, so as to inhibit the movement in the disengagement position of the said second stop means, at least until the electronic control unit receives a signal from the detection means corresponding to the detection of a number of casings at least equal to the determined pre-established number.

BRIEF DESCRIPTION OF THE DRAWINGS

These and other aspects, characteristics and advantages of the present invention will become apparent from the following description of some embodiments thereof, given as a non-restrictive example with reference to the attached drawings wherein.

We must clarify that in the present description and in the claims the terminology used, such as for example the terms vertical, lower, upper, top and bottom, with their declinations, have the sole function of better illustrating the present invention with reference to the drawings and must not be in any way used to limit the scope of the invention itself, or the field of protection defined by the attached claims.

Moreover, persons of skill in the art will recognize that certain sizes, or features, in the figures may have been enlarged, deformed, or shown in an unconventional or non-proportional way, to provide a version of the present invention that is easier to understand. When sizes and/or values are specified in the following description, the sizes and/or values are provided for illustrative purposes only and should not be construed as limiting the field of protection of the present invention, unless such sizes and/or values are present in the attached claims.

To facilitate understanding, identical reference numbers have been used, where possible, to identify identical common elements in the drawings. It should be understood that elements and features of one embodiment can be conveniently combined or incorporated into other embodiments without further clarification.

DETAILED DESCRIPTION OF SOME EMBODIMENTS OF THE PRESENT INVENTION

Figure 1:
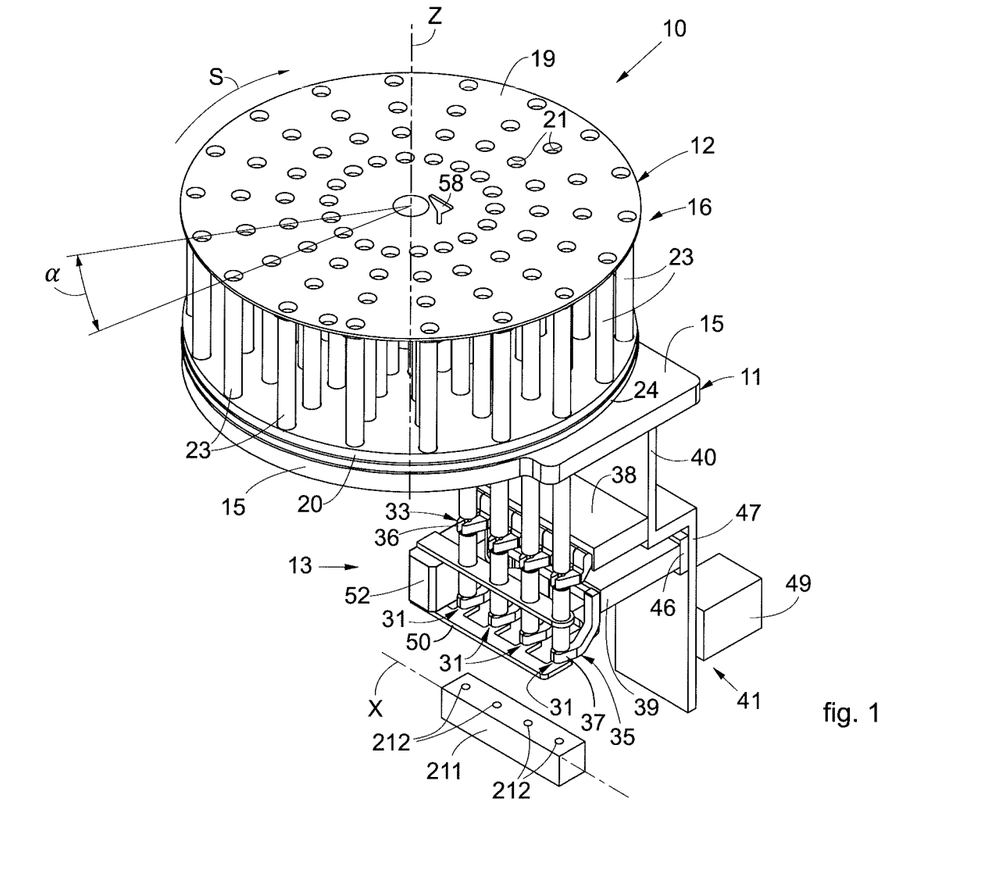
FIG. 1 is a three-dimensional view which represents in a schematic and exemplary manner a feed apparatus for feeding casings for smoking articles according to the present invention.

With reference to FIG. 1, a feed apparatus 10, according to the present invention, for feeding casings 100 (FIG. 3) for smoking articles, is configured to be associated with, or to be part of, a machine 200 (FIG. 2) for the preparation of smoking articles, such as cigarettes, or suchlike.

Figure 2:
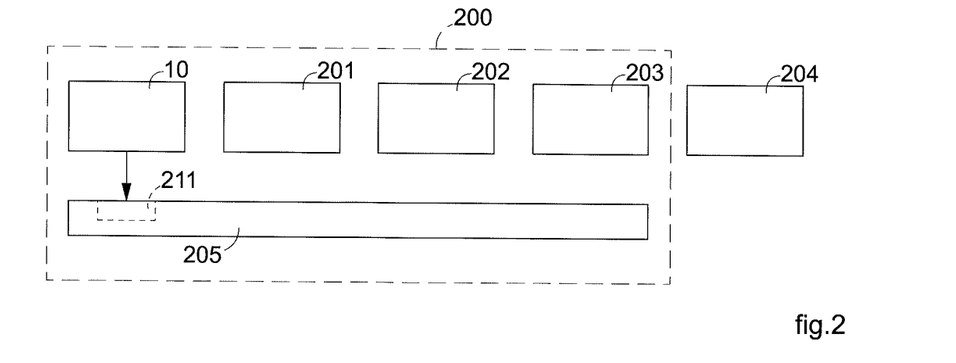
FIG. 2 is a block diagram of a machine that comprises or with which the apparatus in FIG. 1 can be associated.

The machine 200 is schematized in the block diagram of FIG. 2 and, for example, comprises: a filling station 201 configured to fill the casings 100 with a smoking product, for example loose material, such as tobacco, other smokable substances, or a combination thereof; a packaging station 202 configured to package the already filled casings 100, for example to adequately close them; and a distribution station 203, for example for forwarding the smoking articles to a packing station 204, possibly outside the machine 200, but is not limited thereto. The machine 200 may also include a suitable transport apparatus 205 configured to transport the casings 100 and the finished smoking articles adequately and in a coordinated manner, from the apparatus 10 at least toward the distribution station 203.

At least the filling station 201, the packaging station 202, the distribution station 203 and the transport apparatus 205 can be of any known type, or a type that will be developed in the future, or, for example, such as those described in related patent applications for industrial invention filed by or assigned to the Applicant of the present patent application.

For example, the transport apparatus 205 comprises a transport member 211 (FIGS. 1, 2, 5 and 8), having the shape and function of a shuttle and is configured to slide along a transport axis X, for example horizontal. In the example provided here, the transport member 211 comprises four hollow seatings 212, each of which has a truncated cone shape with sizes mating with those of a casing 100, or at least of a lower part thereof. It is clear that the number of seatings 212 can also be different from four.

Figures 5, 7:
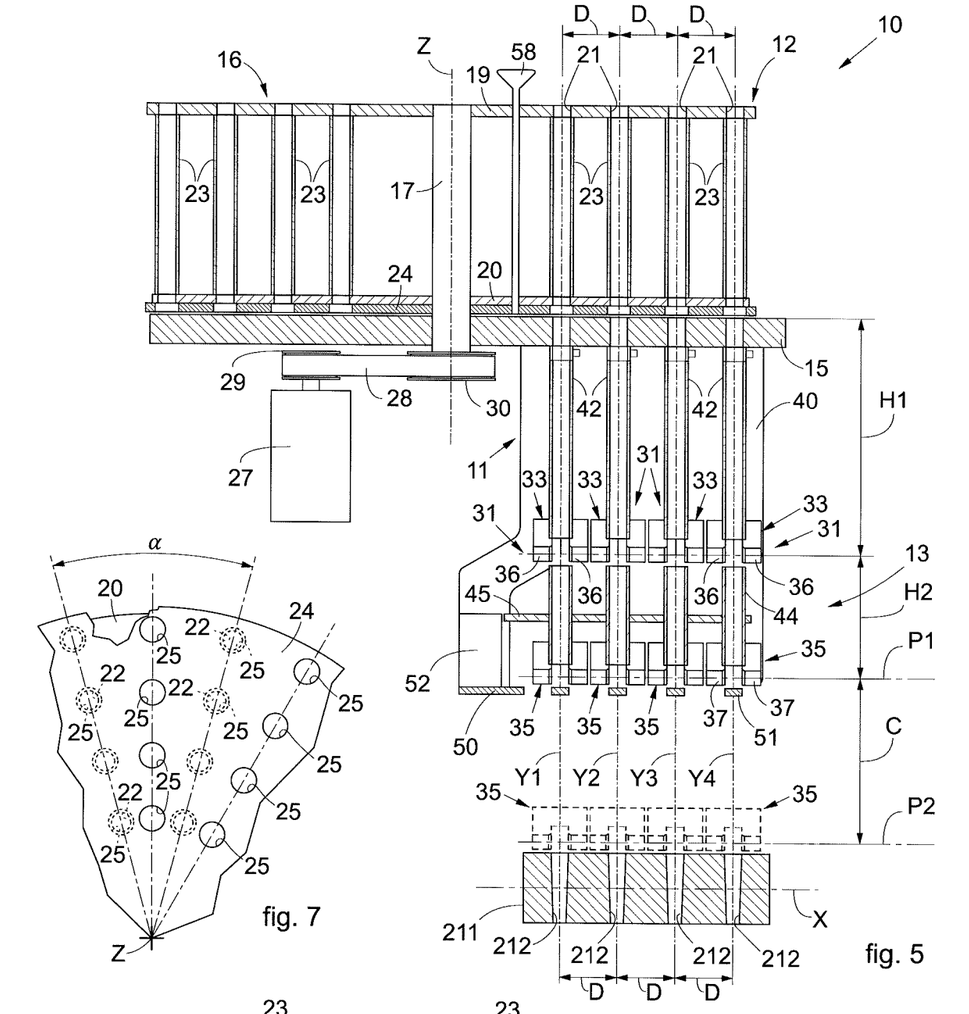
FIG. 5 is a front view, partly sectioned and schematic, of the apparatus in FIG. 1.
FIG. 7 is an enlarged bottom view of a portion of the apparatus in FIG. 1.
Figure 6:
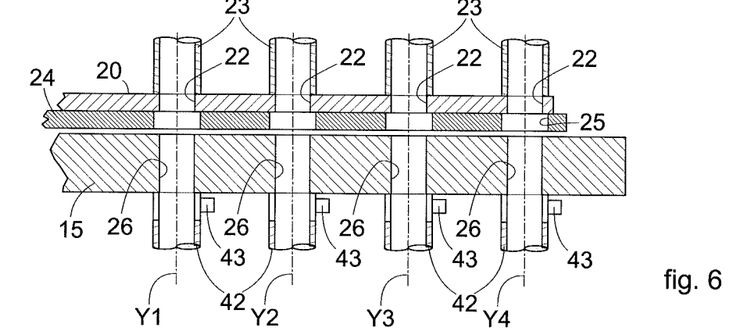
FIG. 6 is an enlarged detail of FIG. 5.
Figures 8, 9:
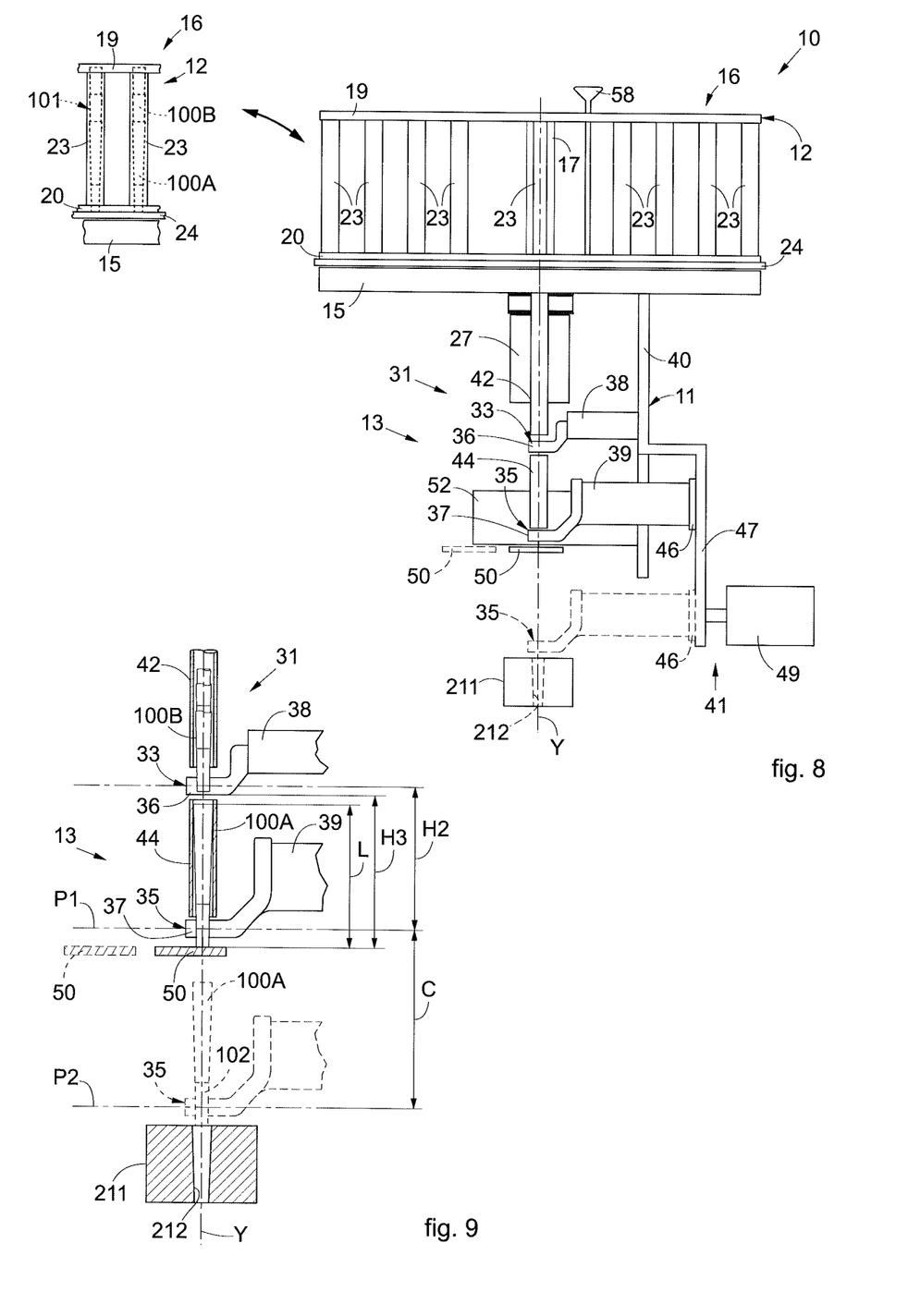
FIG. 8 is a lateral view, schematic and simplified, which shows the apparatus of FIG. 1 in one of its operating conditions.
FIG. 9 is an enlarged detail of FIG. 8.

Each seating 212 is symmetrical with respect to a substantially vertical axis Y and is configured to house a casing 100 that can be inserted from top to bottom (FIGS. 8 and 9). By way of indication, in the example provided here, the axes of the four seatings 212 are indicated respectively with Y1, Y2, Y3 and Y4 (FIGS. 5 and 6).

The distance D between two adjacent seatings 212 is defined in the design phase of the apparatus 10 and/or of the machine 200 and is suited to the management of the plurality of casings 100, as will be described in detail below.

Figure 3:
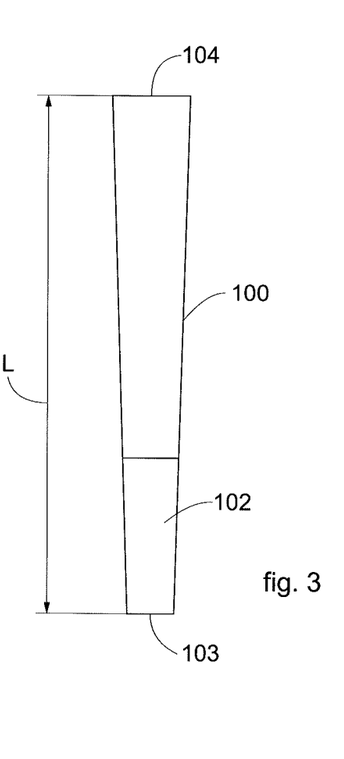
FIG. 3 is a schematic lateral view of a casing suitable to be fed by the apparatus in FIG. 1.

Before describing the apparatus 10 and its functioning in detail, we will now describe an example of a casing 100 (FIG. 3).

Each casing 100 is made of sheet material, for example very thin paper, or other material suitable for making a cigarette, or other smokable product, and is normally provided with a filter 102 of a known type.

The casings 100 have a length L which can vary according to the smoking article to be obtained and is comprised, for example, between about 50 mm and about 150 mm, preferably between about 70 mm and about 120 mm.

Furthermore, each casing 100 has a shape such that it can be easily stacked to form, with other casings 100, a vertical stack 101. For example, each casing 100 can have a truncated cone shape and comprise a first end 103 in correspondence with the filter 102 and a second open end 104, opposite the first end 103 into which another casing 100 can be inserted. Consequently, the first end 103 has a diameter smaller than the diameter of the second end 104.

In the example provided here, each stack 101 (FIG. 4) includes a determined number of casings 100, for example between two and twenty.

Figure 4:
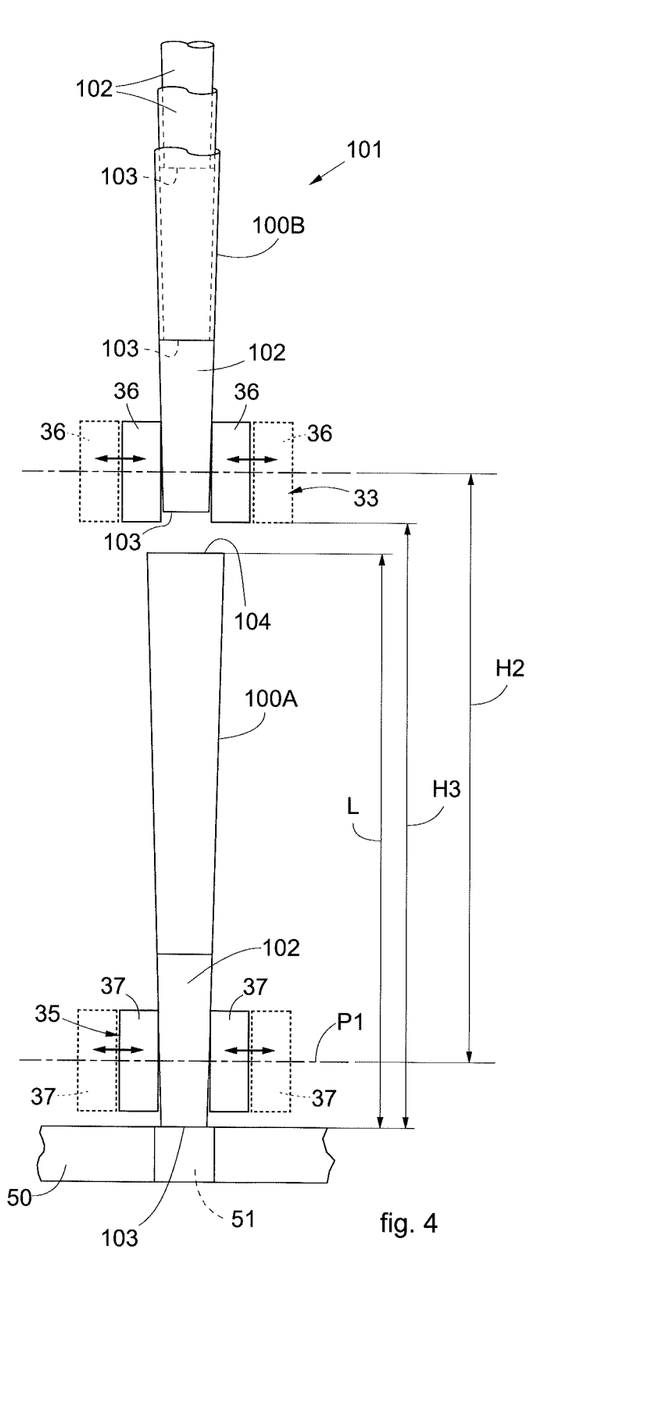
FIG. 4 is a schematic lateral view of a stack of casings suitable to be fed by the apparatus in FIG. 1.

In order to better understand the apparatus 10 and its functioning, which will be described later, the casing 100 disposed in the lowest part of the stack 101 is defined here as the first casing 100A, while the one inserted therein is defined as the second casing 100B and so on up to the last casing, which is therefore the uppermost one in the stack 101.

The apparatus 10 (FIGS. 5 and 8) comprises a support structure 11 on which a feed unit 12 is mounted, disposed higher than the transport member 211 and configured to house and support, temporarily and in an orderly manner, a plurality of stacks 101.

Between the feed unit 12 and the transport member 211 there is a conveyor unit 13 configured to convey one casing 100 at a time from each stack 101 present in the feed unit 12 and automatically insert it into a corresponding seating 212 of the support member 211, as will be described in detail below.

The support structure 11 comprises a plate 15, substantially horizontal, and disposed in a fixed position at a determined distance from the transport member 211.

The feed unit 12 is mounted above the plate 15, and comprises a rotating member 16 substantially in the form of a carousel with a substantially cylindrical bulk and rotatable with a direction of rotation S, clockwise or counterclockwise, with respect to the plate 15, about a substantially vertical axis of rotation Z.

The rotating member 16 comprises a central hub 17 coaxial to the axis of rotation Z and to which an upper disc 19 and a lower disc 20 are attached perpendicularly, which are therefore parallel to each other.

The upper disc 19 is provided with a first plurality of through holes 21, which have their centers lying on four circumferences concentric to the axis of rotation Z and are disposed radially aligned on rows disposed along a plurality of radial segments. The distance between two adjacent circumferences on which the through holes 21 lie is equal to the distance D between two seatings 212 of the transport member 211. In this way, the through holes 21 are divided into groups of four, that is, the same number of seatings 212.

The angle α (FIG. 1) between two groups of four adjacent through holes 21 is a whole submultiple of 360° and in the example shown here is 20°, since there are eighteen groups of four through holes 21, but the present invention is not limited to this. In fact, other embodiments of the present invention, not shown in the drawings, can provide different dispositions and different numbers of through holes 21, since it is sufficient that their position and number are correlated to the position and number of the seatings 212 of the transport member 211.

The lower disc 20 (FIGS. 5 and 6) is provided with a second plurality of through holes 22, which are disposed exactly in correspondence with the first plurality of through holes 21.

An equal plurality of tubular elements 23 is attached between the upper disc 19 and the lower disc 20 and in correspondence with the two pluralities of through holes 21 and 22, and are parallel to the axis of rotation Z and configured to each house a stack 101 of casings 100 to guide it toward the transport member 211 below, as will be described in detail below.

The feed unit 12 also comprises a closing disc 24 (FIGS. 5-8), configured to selectively separate the feed unit 12, that is, the rotating member 16, from the plate 15.

The closing disc 24 is associated with the rotating member 16, so as to be disposed coaxial with respect to the central hub 17 and below the lower disc 20.

The closing disc 24 is provided with a plurality of apertures 25 (FIG. 7) consistent in shape, size and number, with the second plurality of through holes 22 of the lower disc 20, possibly having a slightly larger size than the through holes 22.

The feed unit 12 comprises a control knob 58, for example protruding above the upper disc 19, connected to the closing disc 24 by means of a suitable mechanical connection, of a type known per se and not described in detail, which can comprise for example, a shaft which operatively connects the control knob 58 to the closing disc 24 by means of one or more connection members, also of a known type.

The control knob 58, configured to be rotated manually by an operator, allows the closing disc 24 to be alternately brought into a closed position or an operating position, by means of a rotation of a determinate angle about the axis of rotation Z, for example by an angle equal to approximately half of the angle $\alpha$.

In the closed position the closing disc 24 prevents the descent of the stacks 101 of casings 100 from the tubular elements 23 toward the conveyor unit 13 below, while in the operating position it allows said descent of the stacks 101 of casings 100.

In the operating position (represented by a broken line in FIG. 7), the apertures 25 are aligned with respect to the second plurality of through holes 22, and therefore with respect to the tubular elements 23, and the passage of the stacks 101 of casings 100 is allowed. On the contrary, in the closed position (shown with a solid line in FIG. 7) the apertures 25 are angularly offset with respect to the position of the through holes 22, thus preventing the stacks 101 from descending.

The presence of the closing disc 24 allows the rotating member 16 to be disassembled from the plate 15, for example when the casings 100 contained therein are finished, or when it is necessary to carry out maintenance or cleaning operations. The rotating member 16 can be replaced by another rotating member 16, identical in structure and functionality, the tubular elements 23 of which have been previously completely filled with a plurality of stacks 101 of casings 100, as schematized in FIG. 8. This filling can be carried out in a filling station, not shown, either manually by an operator, or automatically or semi-automatically with the aid of one or more dedicated devices.

When it is necessary to replace a rotating member 16 by another rotating member, the operator takes the closing disc 24 of both rotating members 16 into the closed position, so as to be able to move the rotating members 16 without the stacks 101 of casings 100 protruding from below, under the tubular elements 23.

The plate 15, in a determinate angular position, that is, in correspondence with the seatings 212 of the transport member 211, is provided with four through holes 26 coaxial to the axes from Y1 to Y4 of the seatings 212, so that four stacks 101 of casings 100 can pass freely through them, guided by four corresponding first tubular guide elements 23.

Alternatively, instead of the four through holes 26 on the plate 15, a single slot could be made, having a width equal to the diameter of one of the through holes 26 and a length suitable to allow the four stacks 101 to pass at the same time.

The feed unit 12 also comprises a first electric motor 27 (FIG. 5), of a known type, which is positioned below the plate 15 and is connected to the rotating member 16 by means of a transmission belt 28 and two pulleys 29 and 30, one attached to the shaft of the electric motor 27 and the other to the central hub 17. The first electric motor 27 is configured to rotate the rotating member 16 preferably in angular increments, that is, step by step, equal to the above said angle $\alpha$.

According to a variant, the first electric motor 27 could rotate the rotating member 16 continuously, at a determinate angular speed, such as to take each group of four through holes 21 and 22 in correspondence with the four through holes 26 with a desired timing, taking into account however that the continuous rotation of the rotating member 16, beyond a certain speed, could lead to shearing of the casings 100 during the loading step, and therefore the rotation of the rotating member 16 with angular increments is more advantageous and preferable.

In accordance with the embodiment of the present invention shown here, the conveyor unit 13 comprises four identical pick-up devices 31, each of which is disposed under one of the through holes 26, that is, aligned with the axes Y1, Y2, Y3 and Y4 and is configured to receive a stack 101 of casings 100 and vertically feed one casing 100 at a time toward the transport member 211 below, inserting it into one of the seatings 212, as will be described in detail below.

Each pick-up device 31 comprises a first gripping member 33 and a second gripping member 35, vertically aligned with each other, each of which comprises a gripper having a pair of jaws 36, respectively 37, configured to open and close selectively, controlled by a corresponding actuator 38, respectively 39, which can be of any known type and which therefore is not described in detail here.

As will be clear from the detailed description of the functioning of the apparatus 10, the first gripping member 33 is configured as a second stop means configured to move between an engagement position, in which it cooperates, for each stack 101, with the second casing 100B to temporarily stop the fall of the casings above the first casing 100A, and a disengagement position, in which they free the second casing 100B to let it fall downward. In the example described here, when the first gripping member 33 is in the engagement position, the pair of jaws 36 constituting the gripper that forms the gripping member is in the closed position so as to retain the second casing 100B and the entire stack of casings 100 above it, while when the first gripping member 33 is in the disengagement position the pair of jaws 36 is in the open position.

In particular, all four first gripping members 33 (FIGS. 4, 8 and 9) are mounted on a first vertical plate 40 of the support structure 11 and are disposed at a determined distance H1 from the fixed plate 15, which is preferably greater than the length L of each casing 100, but is not limited to this, and remains permanently in this position.

On the contrary, all four second gripping members 35 are configured as gripping means of the first casing 100A to move together, in both directions, that is, upward and downward, along the corresponding vertical axis Y1, Y2, Y3 or Y4, preferably by means of a single movement device 41, common to all the four pick-up devices 31, from a raised position P1, in which the relative jaws 37 are open and can be selectively closed to grip a casing 100, to a lowered position P2, very close to the transport member 211, in which the relative jaws 37 are reopened to release the casing 100, so that the latter falls by gravity into the underlying seating 212 of the transport member 211.

The distance H2 between the first gripping members 33 and the raised position P1 of the corresponding second gripping member 35 is substantially equal to, or greater than, the length L of each casing 100, while the travel C between the raised position P1 and the lowered position P2 is advantageously greater than the length L of each casing 100.

Between each through hole 26 of the fixed plate 15 and each first gripping member 33 a second tubular guide element 42 is positioned which is attached to the same fixed plate 15 and has the function of guiding a corresponding stack 101 during its descent from the rotating member 16 to the corresponding gripping member 33.

A sensor 43 (FIG. 6) is associated with each second tubular guide element 42, close to the fixed plate 15, and acts as a detection mean configured to detect the possible lack of a casing 100 with respect to a determined pre-established number of casings.

Furthermore, between each first gripping member 33 and the corresponding second gripping member 35, a third tubular guide element 44 is disposed, supported by a horizontal plate 45 of the support structure 11 and having the function of guiding a stack 101 during its descent from the relative first gripping member 33 to the corresponding second gripping member 35.

The movement device 41 comprises a slider 46 connected to the group of the four second gripping members 35 and sliding vertically together with them, guided by a second vertical plate 47 of the support structure 11.

A second electric motor 49, of a known type, is mounted on the second vertical plate 47 and is connected to the slider 46, by means of transmission members of a known type and not shown in the drawings, to selectively move it between a raised position, corresponding to the raised position P1, and a lowered position, corresponding to the lowered position P2 and vice versa.

Figure 10:
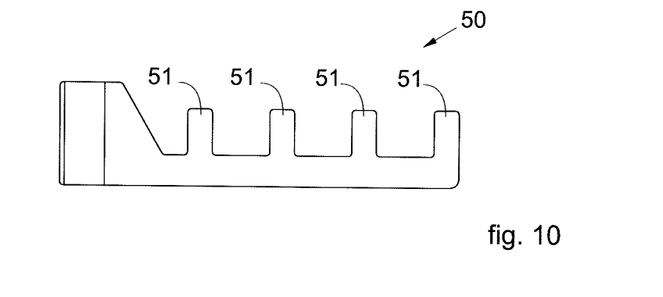
FIG. 10 is a schematic and simplified plan view of a component of the apparatus in FIG. 1.

The conveyor unit 13 also comprises a stop element 50 (FIGS. 9 and 10), disposed horizontally preferably just below the second gripping members 35 and is configured to selectively stop the stacks 101 of casings 100.

As will be evident from the following detailed description of the functioning of the apparatus 10, the stop element 50 is configured as a first stop mean since it intervenes to stop the descent of the first casing 100A, and cooperates with the second stop mean, that is, the first gripping members 33, which intervene in a manner coordinated with it in order to stop the descent of the second casing 100B and of the entire stack 101 of casings 100 above it.

In particular, the stop element 50 consists of a plate that has a comb shape with four teeth 51 disposed exactly in correspondence with the vertical axes Y1, Y2, Y3 and Y4.

The teeth 51 are relatively narrow, so that there is sufficient space between them to allow the passage of the jaws 37 of the second gripping members 35 when they are open and the latter is ascending from the lowered position P2 to the raised position P1.

In particular, the distance H3 (FIGS. 4 and 9) between the upper part of the teeth 51 of the stop element 50 and the lower part of the jaws 36 of the first gripping members 33 is slightly greater than the length L of each casing 100.

The stop element 50 (FIG. 5) is mounted slidingly with respect to the support structure 11 between a position of interference, in which its teeth 51 are positioned in correspondence with the vertical axes Y1, Y2, Y3 and Y4, to stop the descent of the stacks 101, and a position of non-interference, in which the same teeth 51 are retracted so as to be out of the travel of the casings 100 toward the transport member 211. The selective movement of the stop element 50 is controlled by an actuator 52 of a known type.

Figure 11:
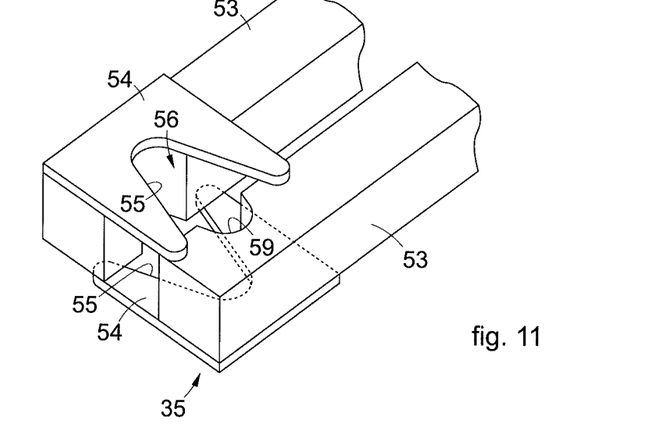
FIG. 11 is a three-dimensional view of a component of the apparatus in FIG. 1 in accordance with a variant embodiment.

In accordance with a variant embodiment, shown in FIG. 11, each jaw 37 of the second gripping members 35 comprises a support arm 53 at the end of which a containing element 54 is disposed. The latter projects from the support arm 53 toward the other jaw 37. In a preferred embodiment, one containing element 54 is disposed above the support arm 53 of a jaw 37, while the other containing element 54 is disposed below the respective support arm 53 of the other jaw 37.

Each containing element 54 comprises a shaped portion 55, for example V-shaped, beveled and at least partly mating with the shape of the casing 100.

The shaped portions 55 of the two jaws 37 reciprocally cooperate to form a housing seating 56 for the casings 100. Preferably, in correspondence with the housing seating 56 on each support arm 53 there is a niche 59 with a substantially cylindrical or truncated cone shape, mating with the external surface of the zone close to the first end 103 of the casing 100. The disposition of the containing elements 54, and the conformation of their shaped portions 55, allow to limit possible lateral movements, or undesired inclinations of the casing 100 with respect to the axis Y, which could compromise the correct closing of the jaws 37 in order to retain the first casing 100A, so as to confer greater reliability on the second gripping members 35, without damaging the casings 100.

In another variant embodiment, the jaws 36 of the first gripping member 33 can also be similar to the jaws 37 described above in accordance with the variant embodiment shown in FIG. 11.

In another embodiment of the present invention, which does not provide to use the second gripping members 35, the stop element 50 could function as the first stop member, or mean, against which the first casing 100A of a stack 101 stops, while each first gripping member 33 could selectively function as a second stop member, or mean, to temporarily stop, for each of the stacks 101, at least the second casing 100B and the other casings 100 above it. In this case, the actuation of the stop element 50, while the corresponding first gripping member 33 is in the blocking position, would cause the first casing 100A of a stack 101 to fall by gravity directly into the underlying seating 212 of the transport member 211. The distance H3 (FIG. 4) between the upper part of the teeth 51 of the stop element 50 and the lower part of the jaws 36 of the first gripping members 33 is slightly greater than the length L of each casing 100.

Figure 12:
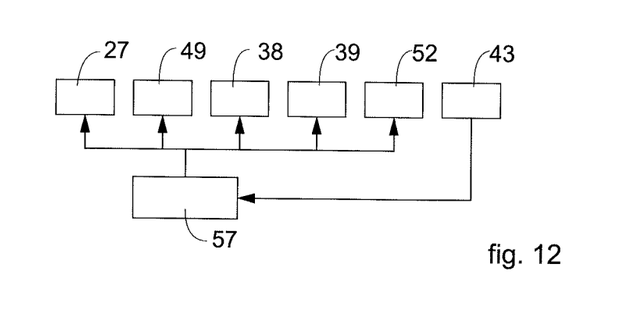
FIG. 12 is an exemplary block diagram of the functioning of an electronic control unit of the apparatus in FIG. 1.

The apparatus 10 also comprises an electronic control unit 57 (FIG. 12), for example of the programmable type, configured to control the first electric motor 27, the second electric motor 49, the actuators 38, 39 and 52. The sensors 43 are also electrically connected to the electronic control unit 57.

The functioning of the apparatus 10 described heretofore, which corresponds to the method according to the present invention, comprises the following steps.

In an initial or rest condition, the feeding unit 12 is stationary, the second gripping members 35 are in their raised position P1, the jaws 36 and 37 of the gripping members 33 and 35 are open and the stop element 50 is in its position of interference, that is, with its teeth 51 in interference with the axes Y1, Y2, Y3 and Y4.

Furthermore, the transport member 211 is in its loading position, with its seatings 212 exactly coaxial to the axes Y1, Y2, Y3, Y4 and ready to receive four casings 100, each from a stack 101.

In a first step, a plurality of stacks 101 of casings 100 are loaded into the first tubular guide elements 23 of the rotating member 16, through the first plurality of through holes 21.

All the stacks 101 loaded will have their first casing 100A, that is, the lowest one, in contact with the closing disc 24 below, disposed in the closed position. This step can be carried out either manually or automatically, for example by means of a robot, or an automated machine, even subsequently, while the rotating member 16 is rotating. Alternatively, a rotating member 16 with the stacks 101 already loaded could be mounted on the plate 15 and could be replaced by another rotating member 16 when the casings 100 are finished, thus allowing the stacks 101 to be loaded into a filling station, separate from the apparatus 10.

At this point, the operator acts on the control knob 58 to take the closing disc 24 into the operating position, in which the stacks 101 begin the descent towards the conveyor unit 13.

By means of the first electric motor 27, controlled by the electronic control unit 57, the rotating member 16 is made to rotate, for example step-by-step with increments equal to the above said angle α, for example in a clockwise direction, as indicated by the arrow S in FIG. 2.

The stacks 101 loaded in a same group of four through holes 21 disposed aligned on the same radial segment, fall by gravity into the second tubular guide elements 42 below, and from these into the third tubular guide elements 44. This happens when the rotation of the rotating member 16 takes the above said group of four through holes 21 into alignment with the four through holes 26 of the fixed plate 15 (FIG. 6).

At this point the electronic control unit 57 commands a pick-up cycle which begins with the drive of the actuators 38 and 39 (FIG. 1) associated with the gripping members 33 and 35 to close the jaws 36 and 37, according to a closing sequence that can possibly be temporally staggered, which provides to command the closure of the jaws 36 of the first gripping members 33 before closing the jaws 37 of the second gripping members 35.

In this way, the first gripping members 33 move into the engagement position in which they grip the second casing 100B (FIG. 4) of each stack 101 to temporarily stop the fall of the casings above the first casing 100A, allowing only this one to fall by gravity against the teeth 51 of the stop element 50 disposed in the position of interference. The second gripping members 35 grip this first casing 100A of each stack 101, for example and preferably in correspondence with its filter 102.

The electronic control unit 57, possibly after having received a consent signal from the actuators 38 and 39 that the operation of closing the jaws 36 and 37 has taken place, first commands the actuator 52 so that it moves the stop element 50 into its position of non-interference and then the second electric motor 49, so that it commands the movement of the slider 46 and of the second gripping members 35 connected thereto from the first raised position P1 to the second lowered position P2.

In this way, only the first casing 100A of each stack 101 will be in the lowered position, with its filter 102 very close to the corresponding seating 212 of the transport member 201, while the second casing 100B of each stack 101 will have remained stationary, retained by the first gripping members 33, together with all the other possible casings 100 of the same stack 101 above it.

Once the second gripping members 35 have reached the second lowered position P2, the electronic control unit 57 commands the actuator 39 so that it commands the opening of the jaws 37 of the second gripping members 35, so that the first casing 100A of each stack 101 falls by gravity into the underlying seating 212 of the transport member 211.

Furthermore, when all the first casings 100A of each stack 101, descending, have passed the stop element 50, the electronic control unit 57 first commands the ascent of the second gripping members 35, by means of the second electric motor 49, and subsequently it commands the actuator 52 to return the stop element 50 to its position of interference.

When the stop element 50 has again reached its position of interference, the electronic control unit 57 commands the actuators 38 so that they open the jaws 36 of the first gripping members 33, so that the second casing 100B can fall downward until it stops against the stop element 50 itself, thus becoming the new first casing 100A, ready to be picked up by the second gripping members 35 and taken on the transport member in the subsequent work cycle.

The pick-up cycle described above is repeated so that four casings 100 at a time are inserted into the seatings 212 of different transport members 211 which sequentially will have been brought, in any suitable way, to the loading position, that is, with their seatings 212 exactly coaxial to the axes Y1, Y2, Y3, Y4.

When the electronic control unit 57 receives from the sensors 43 a signal indicating that in front of them there is no casing 100 of the four stacks 101 introduced into the second tubular guide elements 42, it will command the first electric motor 27, so that it carries out a new rotation by another angle α.

At this point the entire cycle described above is repeated, until all the casings 100 loaded on the feed unit 12 have been picked up and inserted into the seatings 212 of the various transport members 211.

From the above it is clear that the apparatus 10 can also work in a continuous cycle, because the feed of the stacks 101 of casings 100 in the feed unit 12 is independent of the pick-up cycles carried out by the conveyor unit 13.

It should be noted that the presence of the four sensors 43 allows to check the actual presence of casings 100 inside the second and third tubular guide elements 42 and 44 and, by means of the electronic control unit 57 and/or other control means of the machine 200, it is possible to command the rotation of the rotating member 16 adequately, preventing it from erroneously shearing the casings 100 themselves.

Furthermore, the possible lack of one or more casings 100 on one or more of the second and third tubular guide elements 42 and 44 is managed by the electronic control unit 57 which, by means of the four sensors 43 and the actuators 38, commands each first gripping member 33, to selectively retain one or more stacks 101 in which one or more casings 100 are missing, compared with a determined pre-established number of casings 100, to obtain the leveling of the casings 100 in the second and third tubular guide elements 42 and 44. This function allows to obtain continuous functioning of the feed unit 12 even when there is a possible unbalanced loading of the stacks 101, for example with a number of casings 100 different from the determined pre-established number, by an operator and/or a robot, or an automated machine.

It is clear that modifications and/or additions of parts or steps can be made to the feed apparatus 10 and feed method for automatically feeding casings 100 for smoking articles described heretofore, without thereby departing from the field of the present invention as defined by the claims.

For example, in general, every movement made with each of the electric motors cited above can be obtained by means of any type of actuation of another kind, for example pneumatic or fluid dynamic.

It is also clear that, although the present invention has been described with reference to a specific example, a person of skill in the art shall certainly be able to achieve many other equivalent forms of feed apparatus 10 and feed method for automatically feeding casings for smoking articles, all coming within the field of protection of the present invention.

In the following claims, the sole purpose of the references in brackets is to facilitate reading: they must not be considered as restrictive factors with regard to the field of protection defined by the claims themselves.

The invention claimed is:

1. Feed apparatus for automatically feeding casings for forming smoking articles toward at least one transport member having one or more first seatings aligned along a substantially horizontal transport axis and configured to each receive one of said casings, in which said casings are hollow and stackable so as to be partly inserted into one another forming stacks, said apparatus comprising:

feed means disposed in a position above said at least one transport member and configured to temporarily support the stacks of said casings and conveyor means interposed between said feed means and said at least one transport member and configured to selectively convey said casings from said feed means one by one toward said one or more first seatings of said at least one transport member, in which each of said stacks comprises a first casing located at a lower end of the respective stack and in which at least a second casing is partly inserted from above, said conveyor means comprising first stop means configured to move between a position of interference, in which said first stop means cooperate, for each of said stacks, with said first casing to temporarily stop the fall of the first casing, and a position of non-interference, in which said first stop means free said first casing, so that the first casing freed can be released into one of said one or more first seatings, wherein said conveyor means also comprise second stop means, disposed between said feed means and said first stop means, configured to move between an engagement position, in which said second stop means cooperate, for each one of said stacks, with the second casing closest to the first casing, in order to temporarily stop the fall, for each of said stacks), of the casings above said first casing, at least when said first stop means are in the position of non-interference, and a disengagement position, in which said second stop means free the second casing closest to the first casing to let it fall onto said first stop means, only while said first stop means are in the position of interference, the second casing left to fall by said second stop means becoming the new first casing when it arrives at said first stop means, wherein said feed means comprise a rotating member mounted rotatably about a substantially vertical axis of rotation and having a plurality of second seatings parallel to said axis of rotation and configured to each receive one of said stacks of said casings, wherein said rotating member is configured to perform incremental rotations, each of a determinate angle, to selectively take a row of said plurality of second seatings disposed along a radial segment of said rotating member, in vertical alignment with said conveyor means, wherein said feed means comprise a closing disc configured to selectively occlude said plurality of second seatings and free only the second seatings which are located along the row disposed along said radial segment in vertical alignment with said conveyor means, so as to allow the descent only of the stacks of casings which are located in the second seatings which are not occluded by said closing disc.

2. Feed apparatus as in claim 1, wherein said conveyor means also comprise gripping means configured to grip said first casing from said first stop means and to take said first casing gripped in proximity to said at least one transport member, so as to release it into one of said one or more first seatings.

3. Feed apparatus as in claim 2, wherein said first gripping means are mobile along a first rectilinear segment, lying on a vertical plane, between a first raised position, when they grip said first casing and a second lowered position, when they take said first casing gripped in proximity to said at least one transport member.

4. Feed apparatus as in claim 3, wherein said gripping means are configured to grip said first casing in said first raised position when said first stop means are in the position of interference, and move to said second lowered position to take said first casing gripped in proximity to said at least one transport member, when said first stop means are in the position of non-interference.

5. Feed apparatus as in claim 1, wherein said rotating member comprises an upper disc and a lower disc disposed coaxial to and opposite each other, with a plurality of tubular elements interposed, communicating with said plurality of second seatings, said tubular elements being disposed parallel to the axis of rotation.

6. Feed apparatus as in claim 1, wherein said second stop means each comprise at least one gripper having a pair of jaws, configured to selectively open and close on said casings.

7. Feed apparatus as in claim 1, further comprising detection means positioned between said feed means and said conveyor means configured to detect, in each stack, the possible lack of casings with respect to a determined pre-established number, and an electronic control unit configured to control, in response to a signal emitted by said detection means, said second stop means so that they selectively retain the stack, the number of casings of which is lower than the determined pre-established number, so as to inhibit the movement in the disengagement position of said second stop means, at least until the electronic control unit receives a signal from the detection means corresponding to the detection of a number of casings at least equal to the determined pre-established number.

8. Feed apparatus as in claim 1, wherein said first stop means comprise a comb-shaped plate which is mobile along a second rectilinear segment, lying on a horizontal plane, when it moves between the position of interference and the position of non-interference.

9. Feed apparatus as in claim 1, wherein the distance, taken along a vertical axis, between the first stop means and the second stop means, remains fixed and is slightly greater than the length of said casings.

10. Feed method for automatically feeding casings for forming smoking articles to at least one transport member having one or more first seatings aligned along a substantially horizontal transport axis and configured to each receive one of said casings, wherein said casings are hollow and stackable so as to be partly inserted one into the other forming stacks, said method comprising;

feeding said stacks of casings from feed means, disposed in a position above said at least one transport member, to conveyor means interposed between said feed means and said at least one transport member, and selectively conveying by said conveyor means said casings one by one toward said one or more first seatings of said at least one transport member, wherein each of said stacks comprises a first casing located at a lower end of the respective stack and in which at least a second casing is partly inserted from above, where in said conveying step, first stop means of said conveyor means, disposed between said feed means and said at least one transport member, are moved between a position of interference, in which said first stop means cooperate, for each of said stacks, with said first casing, temporarily stopping the fall of the first casing, and a position of non-interference, in which said first stop means free said first casing, so that the first freed casing is released into one of said one or more first seatings, wherein second stop means of said conveyor means, disposed between said feed means and said first stop means, are moved between an engagement position, in which said second stop means cooperate, for each of said stacks, with the second casing closest to the first casing, temporarily stopping the fall, for each of said stacks, of the casings above said first casing, at least when said first stop means are in the position of non-interference, and a disengagement position, in which said second stop means free the second casing closest to the first casing and let it fall on said first stop means, only while said first stop means are in the position of interference, the second casing left to fall by said second stop means becoming the new first casing when it arrives at said first stop means, wherein in said feeding step a rotating member of said feed means, mounted rotatably about a substantially vertical axis of rotation and provided with a plurality of second seatings, receives in one or more of said second seatings one or more of said casings organized so as to form said stacks and performs incremental rotations, each of a determinate angle, to selectively bring a row of said plurality of second seatings disposed along a radial segment of said rotating member into vertical alignment with said conveyor means, and selectively occluding by a closing disc of said feed means said plurality of second seatings and freeing by said closing disc only the second seatings which are located along the row disposed along said radial segment in vertical alignment with said conveyor means, so as to allow the descent only of the stacks of casings which are located in the second seatings which are not occluded by said closing disc.

11. Feed method as in claim 10, wherein, in said conveying step, gripping means of said conveyor means grip said first casing from said first stop means and take said first casing gripped in proximity to said at least one transport member to release it into one of said one or more first seatings.

12. Feed method as in claim 11, wherein when said gripping means grip said first casing, said first stop means are in the position of interference, and when, on the contrary, said gripping means take said first casing gripped in proximity to said at least one transport member, said first stop means are in the position of non-interference.

13. Feed method as in claim 10, further comprising detecting by detection means positioned between said feed means and said conveyor means the possible lack of said casings in each stack, with respect to a determined pre-established number, and controlling by an electronic control unit, in response to a signal emitted by said detection means, said second stop means so that they selectively retain the stack, the number of casings of which is lower than the determined pre-established number, so as to inhibit the movement in the disengagement position of said second stop means, at least until the electronic control unit receives a signal from the detection means corresponding to the detection of a number of casings at least equal to the determined pre-established number.

14. Feed apparatus for automatically feeding casings for forming smoking articles toward at least one transport member having one or more first seatings aligned along a substantially horizontal transport axis and configured to each receive one of said casings, in which said casings are hollow and stackable so as to be partly inserted into one another forming stacks, said apparatus comprising:

feed means disposed in a position above said at least one transport member and configured to temporarily support the stacks of said casings and conveyor means interposed between said feed means and said at least one transport member and configured to selectively convey said casings from said feed means one by one toward said one or more first seatings of said at least one transport member, wherein said feed means comprise a rotating member mounted rotatably about a substantially vertical axis of rotation and having a plurality of second seatings parallel to said axis of rotation and configured to each receive one of said stacks of said casings, wherein said rotating member is configured to perform incremental rotations, each of a determinate angle, to selectively take a row of said plurality of second seatings disposed along a radial segment of said rotating member, in vertical alignment with said conveyor means, wherein said feed means comprise a closing disc configured to selectively occlude said plurality of second seatings and free only the second seatings which are located along the row disposed along said radial segment in vertical alignment with said conveyor means, so as to allow the descent only of the stacks of casings which are located in the second seatings which are not occluded by said closing disc.

* * * * *